(12) United States Patent
Jesurum

(10) Patent No.: US 8,851,019 B2
(45) Date of Patent: Oct. 7, 2014

(54) PET RESTRAINT SYSTEM

(75) Inventor: Robert Jesurum, Rye, NH (US)

(73) Assignee: Jesurum Scientific Enterprises, Inc., Rye, NH (US)

( * ) Notice: Subject to any disclaimer, the term of this patent is extended or adjusted under 35 U.S.C. 154(b) by 168 days.

(21) Appl. No.: 13/495,569

(22) Filed: Jun. 13, 2012

(65) Prior Publication Data

US 2012/0312250 A1 Dec. 13, 2012

Related U.S. Application Data

(60) Provisional application No. 61/496,370, filed on Jun. 13, 2011, provisional application No. 61/513,148, filed on Jul. 29, 2011, provisional application No. 61/559,476, filed on Nov. 14, 2011.

(51) Int. Cl.
*A01K 15/04* (2006.01)
*A01K 15/02* (2006.01)

(52) U.S. Cl.
CPC .................................. *A01K 15/023* (2013.01)
USPC ...................................................... 119/721

(58) Field of Classification Search
USPC .......................................... 119/712, 720, 721
See application file for complete search history.

(56) References Cited

U.S. PATENT DOCUMENTS

| | | |
|---|---|---|
| 4,593,273 A | 6/1986 | Narcisse |
| 4,736,196 A | 4/1988 | McMahon et al. |
| 4,899,135 A | 2/1990 | Ghahariiran |
| 4,918,425 A | 4/1990 | Greenberg et al. |
| 5,337,041 A | 8/1994 | Friedman |
| D356,516 S | 3/1995 | Price |
| 5,684,476 A | 11/1997 | Anderson |
| D388,720 S | 1/1998 | Montgomery |
| 5,850,196 A | 12/1998 | Mowers |
| 5,857,433 A | 1/1999 | Files |
| D406,073 S | 2/1999 | Clemons |
| 5,868,100 A | 2/1999 | Marsh |
| 5,900,817 A | 5/1999 | Olmassakian |
| 5,939,988 A | 8/1999 | Neyhart |
| D419,899 S | 2/2000 | Levar et al. |
| 6,043,748 A | 3/2000 | Touchton et al. |

(Continued)

FOREIGN PATENT DOCUMENTS

| | | |
|---|---|---|
| CN | 1835038 A | 9/2006 |
| WO | WO-2006007705 A1 | 1/2006 |
| WO | WO-2009106896 A3 | 10/2009 |
| WO | WO-2009052526 A3 | 11/2009 |

OTHER PUBLICATIONS http://www.gpsdogcollartracking.com/product/Astro 220 DC40, downloaded Nov. 8, 2012, 1 pages.

(Continued)

*Primary Examiner* — Monica Williams
(74) *Attorney, Agent, or Firm* — Goodwin Procter LLP

(57) ABSTRACT

In various embodiments, a method of controlling a position of an animal includes tracking a position of the animal using a positioning system, such as a global positioning system. A time-varying position of a base object is also tracked using the positioning system, and a relative position of the animal with respect to the base object is determined, based on the positions of the animal and the base object. When the relative position exceeds a minimum value, a stimulus is provided to the animal to encourage the animal to reduce the relative position. A user of the system may define a region for the animal using a map of the surrounding territory.

24 Claims, 8 Drawing Sheets

(56) References Cited

U.S. PATENT DOCUMENTS

| | | | |
|---|---|---|---|
| D423,389 S | 4/2000 | Boyd |
| 6,078,260 A | 6/2000 | Desch |
| 6,079,367 A | 6/2000 | Stapelfeld et al. |
| 6,127,931 A | 10/2000 | Mohr |
| D438,132 S | 2/2001 | Givings |
| D453,698 S | 2/2002 | Marks |
| 6,396,403 B1 | 5/2002 | Haner |
| 6,441,778 B1 | 8/2002 | Durst et al. |
| 6,563,427 B2 | 5/2003 | Bero et al. |
| 6,581,546 B1 | 6/2003 | Dalland et al. |
| 6,720,879 B2 | 4/2004 | Edwards |
| 6,850,151 B1 | 2/2005 | Calhoun et al. |
| 6,873,949 B2 | 3/2005 | Hickman et al. |
| 6,885,305 B2 | 4/2005 | Davis |
| 6,915,216 B2 | 7/2005 | Troxler |
| 7,012,522 B1 | 3/2006 | Le Van |
| 7,034,695 B2 | 4/2006 | Troxler |
| D520,393 S | 5/2006 | Darby |
| 7,095,325 B2 | 8/2006 | McDonald et al. |
| 7,135,967 B2 | 11/2006 | Culpepper et al. |
| D535,205 S | 1/2007 | Frederick et al. |
| 7,271,717 B1 | 9/2007 | Amos |
| 7,376,530 B2 | 5/2008 | Bienvenu et al. |
| 7,377,234 B2 | 5/2008 | Belcher |
| 7,411,492 B2 | 8/2008 | Greenberg |
| 7,423,538 B2 | 9/2008 | Gonzalez |
| 7,589,638 B2 | 9/2009 | Jackson et al. |
| 7,634,975 B2 | 12/2009 | Kates |
| 7,663,502 B2 | 2/2010 | Breed |
| 7,786,876 B2 | 8/2010 | Troxler |
| 7,801,506 B2 | 9/2010 | Haave et al. |
| 7,848,905 B2 | 12/2010 | Troxler et al. |
| 7,920,066 B2 | 4/2011 | Troxler |
| 8,126,680 B2 | 2/2012 | Troxler et al. |
| 8,149,110 B2 | 4/2012 | Troxler |
| 8,624,723 B2 | 1/2014 | Troxler |
| 2004/0046658 A1 | 3/2004 | Turner et al. |
| 2004/0080420 A1 | 4/2004 | Roberts |
| 2004/0196182 A1 | 10/2004 | Unnold |
| 2006/0027185 A1 | 2/2006 | Troxler |
| 2007/0204804 A1 | 9/2007 | Swanson et al. |
| 2008/0129488 A1 | 6/2008 | Hill |
| 2008/0162034 A1 | 7/2008 | Breen |
| 2008/0246656 A1 | 10/2008 | Ghazarian |
| 2008/0252527 A1 | 10/2008 | Garcia |
| 2009/0102668 A1 | 4/2009 | Thompson et al. |
| 2009/0255484 A1 | 10/2009 | Muelken |
| 2009/0289785 A1 | 11/2009 | Leonard |
| 2010/0066545 A1 | 3/2010 | Ghazarian |
| 2011/0061605 A1 | 3/2011 | Hardi et al. |

OTHER PUBLICATIONS http://www.gpsdogcollartracking.com, downloaded Nov. 8, 2012, 3 pages.

http://www.gps-practice-and-fun.com/gps-pet-tracking.html, downloaded Nov. 8, 2012, 6 pages.

http://www.retrievatracking.com/, downloaded Nov. 28, 2012, 1 page.

http://ieeexplore.ieee.org/xpl/freeabs_alljsp?arnumber=5504688, downloaded Nov. 8, 2012, 1 page.

McDaniel et al., "Object Tracking Device," 2002, 22 pages, available at: http://eccs.onu.edu/~seniordesign/senior2001-2002/object-track-web/otd/FinalReport.doc.

International Search Report and Written Opinion for PCT/US2012/042253 dated Sep. 13, 2012, 13 pages.

PET RESTRAINT SYSTEM

CROSS-REFERENCE TO RELATED APPLICATION

This application claims priority to and the benefit of, and incorporates herein by reference in its entirety, U.S. Provisional Patent Application No. 61/496,370, which was filed on Jun. 13, 2011, U.S. Provisional Patent Application No. 61/513,148, which was filed on Jul. 29, 2011, and U.S. Provisional Patent Application No. 61/559,476, which was filed on Nov. 14, 2011.

TECHNICAL FIELD

In various embodiments, the invention relates to systems and methods for monitoring the position of an animal. In particular, embodiments of the invention relate to systems and methods for training an animal to remain within an area of interest, based on the monitored position of the animal.

BACKGROUND

Electronic devices that are worn by a pet and deliver electrical shocks or other stimulation to train the pet to remain within an established area are well known. There are two primary types of pet restraint systems being sold today. One type of system utilizes perimeter control and includes a wire that emits a weak radio signal to form an electronic perimeter. The pet wears a collar with battery powered electrodes. When the pet attempts to cross the perimeter, it hears an audible alarm and receives an electric shock. Pets are quickly trained to stay within the perimeter to avoid the shock. Some systems include portable transmitting devices that can be positioned within a house or yard to discourage the pet from approaching other forbidden zones.

Systems that utilize perimeter control have a number of deficiencies. For example, installation of the perimeter wire is expensive and often requires cutting through hard surfaces that cross the perimeter, such as driveways. The perimeter is also subject to failure during prolonged power outages or when the wire is broken. Additionally, if the pet is sufficiently enticed to leave the perimeter (by another animal or a perceived threat), the electrical shocks will stop a short distance beyond the perimeter. Not only is the pet then free to roam, but it is punished if it wants to reenter by having to again endure the shock when it tries to cross the perimeter to regain entry. Accordingly, once the pet is out, the pet will stay out. Another disadvantage of these systems is that the shocks and warning sounds are generally all or nothing, with no intermediate levels. The system also does not track the location of the pet, so there is no way to know where the pet is, whether inside or outside of the perimeter, except by calling the pet and/or visually locating it. Further, other than activating an alarm when the perimeter wire is broken, there is no alarm to alert the owner that the system is not operating to restrain the pet, nor is there any alarm to alert owner that the pet is at large. Finally, the perimeter wire is a large antenna that attracts static charge (e.g., from electrical storms), thereby presenting a hazard to other electronics or even to a house itself.

The second type of system is far less expensive and consists of a transmitter that sets up a radial control area. As long as the pet stays within the area of the transmitter, it receives no shock. This system has one big advantage: if the pet is outside the control area, it is shocked until it returns, thereby lessening the possibility that the pet will roam. This system, however, shares some of the disadvantages of the perimeter control system, and has two major additional drawbacks. For example, if the transmitter fails, the pet is continually shocked. Also, the perimeter is radial and has little to do with actual boundaries, which makes it difficult for the pet to roam the entire yard and/or to learn and obey the actual boundary locations of the property. Like the perimeter control system, the shock and alarm are all or nothing, the system does not track the pet's location, and there is no alarm to alert owner that the system may have failed.

Accordingly, there is a need for an improved system for tracking and manipulating the location of an animal, such as a pet.

SUMMARY OF THE INVENTION

In various embodiments, the present invention features systems and methods for tracking the position of an animal (e.g., a pet) and encouraging the animal to move or behave in a desired manner. The systems generally use or include a positioning system (e.g., a global positioning system in conjunction with a WIFI positioning system) to track the position of the animal, and a stimulation device to provide a stimulus (e.g., a vibration or electrical shock) to the animal. A connection to a cellular network enables the owner of the system to track the animal's location and locate the animal when it is missing or lost.

Compared to existing systems and devices, the systems and devices described herein offer several advantages. For example, the systems and devices are easier to install, with no cutting of hard surfaces, such as driveways, required. The systems and devices also track the location of the animal, which allows the animal to be continuously monitored, both on and off the property, and easily located. Tracking the location of the animal also allows the system to more intelligently deliver electrical shocks or other stimulus. For example, the system may deliver warning shocks, vibrations, and/or sounds to the animal based on its velocity and direction. The system may also encourage an animal to return to a property by, for example, discontinuing electrical shocks or providing audible messages of positive reinforcement when the animal is heading in the desired direction. A further advantage of the system is that it allows the animal's position with respect to a user (e.g., a pet owner) to be monitored and controlled.

In general, in one aspect, embodiments of the invention relate to a method of controlling a position of an animal (e.g., a pet). The method includes tracking a position of the animal using a positioning system, and tracking a time-varying position of a base object (e.g., a device held by a pet owner) using the positioning system. The method also includes determining a relative position of the animal with respect to the base object, based on the positions of the animal and the base object. When the relative position exceeds a minimum value, a stimulus is provided to the animal to encourage the animal to reduce the relative position.

In certain embodiments, a strength and/or frequency of the stimulus is based on a magnitude of the relative position. The stimulus may be, for example, a vibration, an electrical shock, and/or a noise. In some embodiments, the method also includes (i) tracking a direction of travel of the base object using the positioning system, and (ii) predicting a path of travel for the base object using the position of the base object and the direction of travel of the base object. The stimulus may be provided to encourage the animal to travel alongside the path of travel (e.g., to heel alongside the pet owner).

In another aspect, the invention relates to a method of restraining a position of an animal (e.g., a pet). The method includes providing a map corresponding to a territory in the vicinity of a positioning system. Information is received from a user defining a region on the map corresponding to a portion of the territory. A position of an animal within the territory is monitored using the positioning system. When the animal enters the portion of the territory corresponding to the region defined on the map, a stimulus is provided to the animal to encourage the animal to exit that portion of the territory.

In certain embodiments, a strength and/or a frequency of the stimulus is based on the position of the animal in the portion of the territory. The stimulus may be, for example, a vibration, an electrical shock, and/or a noise. In one embodiment, the first positioning system and the second positioning system are the same positioning system. The map may be provided as an Internet-enabled application. Monitoring the position of the animal may include, for example, determining the position of the animal within the territory using a global positioning system differential localizer.

In another aspect, the invention relates to a method of restraining a position of an animal. The method includes providing a map corresponding to a territory in the vicinity of a positioning system. Information is received from a user defining a region on the map corresponding to a portion of the territory, and a position of an animal within the territory is monitored using the positioning system. When the animal enters the portion of the territory corresponding to the region defined on the map, a stimulus is provided to the animal to encourage the animal to exit the portion of the territory. Upon receipt of a command from a user, the method also includes (i) discontinuing the monitoring of the position of the animal within the territory using the positioning system, and (ii) enabling the monitoring of the position of the animal relative to a base object using the positioning system. Subsequent to the enabling of relative position monitoring, when the relative position exceeds a minimum value, a stimulus is provided to the animal to encourage the animal to reduce the relative position.

A position of the base object may be time-varying or fixed. In one implementation, the base object is the positioning system. The stimulus may be, for example, a vibration, an electrical shock, and a noise.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

It is contemplated that devices, systems, methods, and processes of the claimed invention encompass variations and adaptations developed using information from the embodiments described herein. Adaptation and/or modification of the devices, systems, methods, and processes described herein may be performed by those of ordinary skill in the relevant art.

Throughout the description, where devices and systems are described as having, including, or comprising specific components, or where processes and methods are described as having, including, or comprising specific steps, it is contemplated that, additionally, there are devices and systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Various embodiments of the invention relate to systems and devices that utilize a positioning system, such as a global positioning system (GPS), to monitor the geographic position of an animal. The systems and devices may be used to prevent the animal from entering forbidden territories or areas, to train the animal to behave in a certain manner, and/or to locate the animal when it is lost.

The systems and devices may be used with any type of animal. For example, the animal may be a pet (e.g., a dog, a cat, or a bird), a farm animal (e.g., a cow or horse), a zoo animal, or a person (e.g., a child, a criminal, or a senescent adult).

Figure 1:
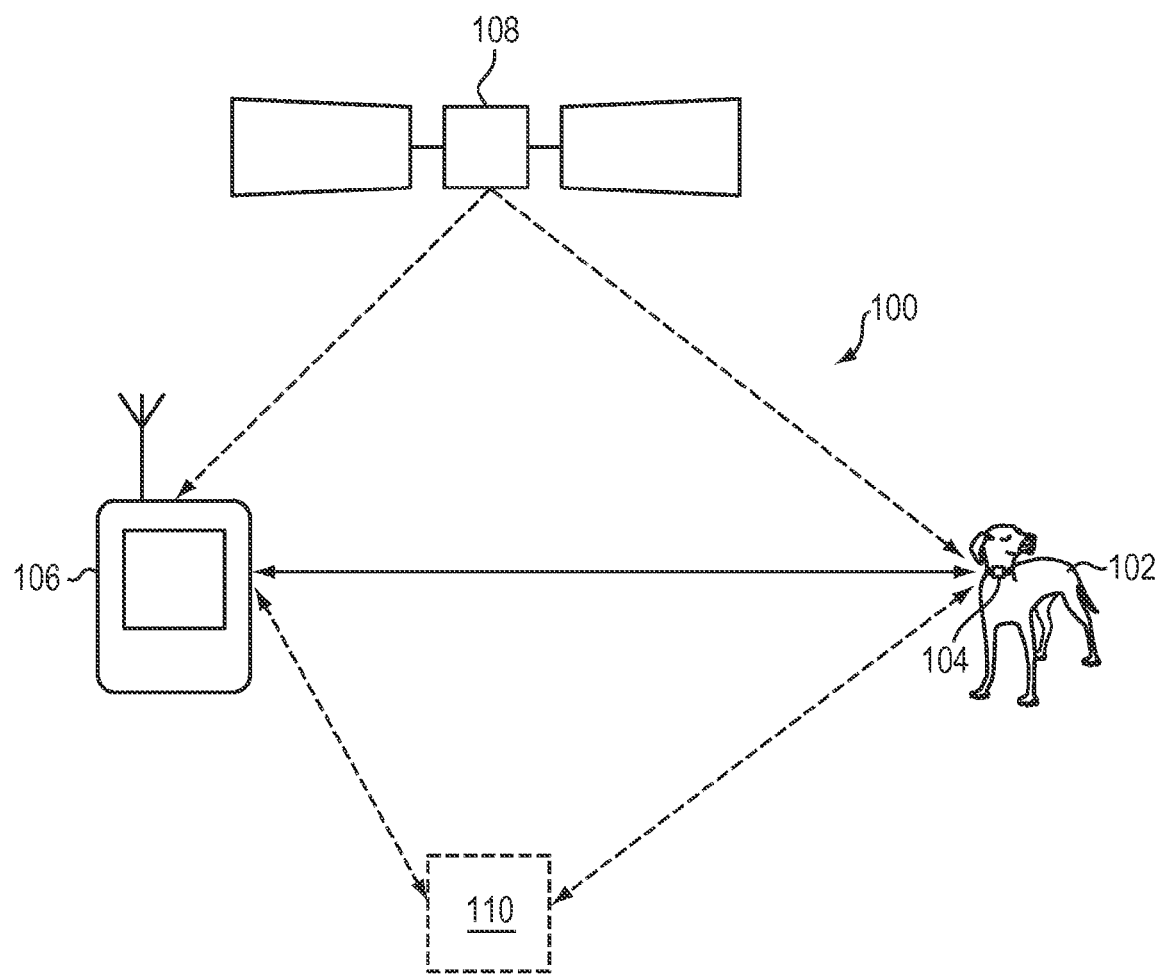
FIG. 1 is a schematic representation of a system for monitoring and controlling the position of an animal, in accordance with certain embodiments of the invention.

Referring to FIG. 1, in certain embodiments, a system 100 for monitoring a geographic location of an animal 102 (e.g., a pet) includes an animal attachment device 104 and a portable base station 106. The animal attachment device 104 may be or may include a collar, a harness, clothing, a tag, or other device worn by or attached to the animal 102. The attachment device 104 includes a GPS receiver for determining the position of the animal 102, based on signals received from a positioning system 108 (e.g., GPS), and a radio transceiver for relaying data (e.g., position data) to other system components, such as the base station 106. The attachment device 104 also includes a stimulation device for delivering a stimulus to the animal 102 to encourage the animal 102 to move or behave in a certain manner. The stimulation device may be or include, for example, a vibrating device (e.g., a motor), a speaker for delivering audible messages to the animal, and/or electrical contacts or electrodes for delivering electrical shocks to the animal 102. For example, the stimulation device may provide an audible message or vibration sensation to the animal 102 when the animal 102 approaches a forbidden area. If the animal 102 continues to approach the forbidden area, electrical shocks may be delivered to the animal 102. The electrical shocks may be delivered intermittently to the animal 102 and may increase in power and/or frequency as the animal 102 continues to approach the forbidden area.

The attachment device 104 communicates with other system components (e.g., the base station 106) using the transceiver. For example, the transceiver may transmit the geographic location of the animal 102 to the base station 106. The base station 106 may then compute the animal's location with respect to a forbidden area, and may send a signal to the attachment device 104 to deliver a stimulus to the animal 102. In one embodiment, the transceiver preserves battery power by operating nominally in an off mode and waking up only as needed to transmit and receive data from other components. Part of the information received by the transceiver may be the latency for the next call, which may vary according to the animal's movement or proximity to a forbidden area. To facilitate communication with the attachment device 104, the attachment device 104 includes an antenna, which may be threaded into the attachment device 104 (e.g., a collar) for greater sensitivity. The attachment device 104 also includes a battery, which may be removed and/or recharged, as desired (e.g., each evening).

Figure 2A:
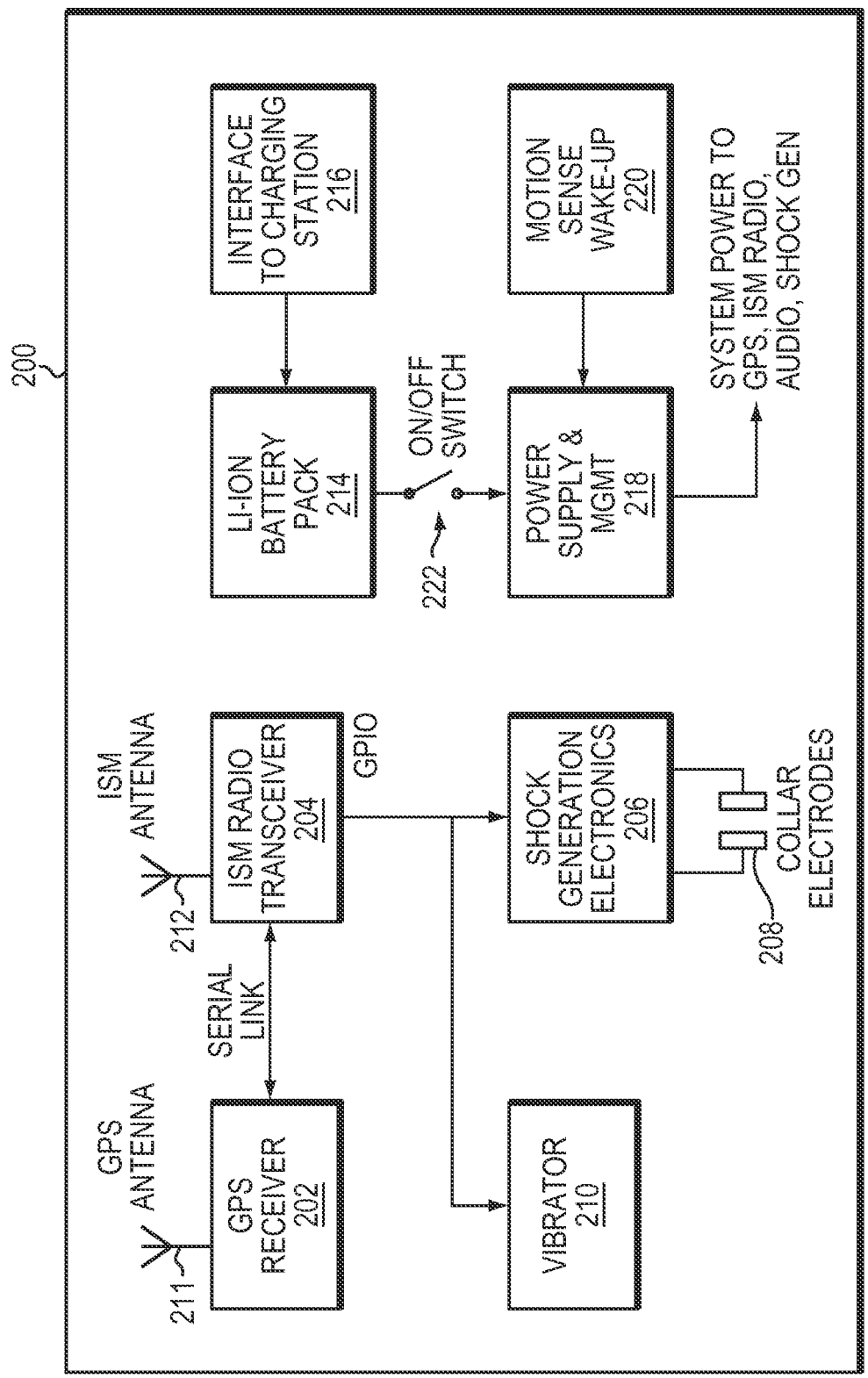
FIGS. 2a and 2b are schematic representations of a device that is attached to an animal, in accordance with certain embodiments of the invention.

FIG. 2a is a schematic diagram of an attachment device 200 in accordance with certain embodiments of the invention. The attachment device 200 includes a GPS receiver 202, an industrial, scientific, and medical (ISM) radio 204, shock generation electronics 206, electrodes 208, and a vibrating device 210. The GPS receiver 202 and the ISM radio 204 are linked to one another (e.g., with a serial link) and include a GPS antenna 211 and an ISM antenna 212, respectively. The attachment device 200 also includes a battery 214 (e.g., a lithium ion battery pack), an interface 216 to connect the battery to a charging station, and a power supply station 218 for providing power to attachment device components. A motion sensor 220 is included to activate or wake-up the attachment device upon movement of the animal 102. A switch 222 is included to turn the attachment device 200 on or off.

Figure 2B:
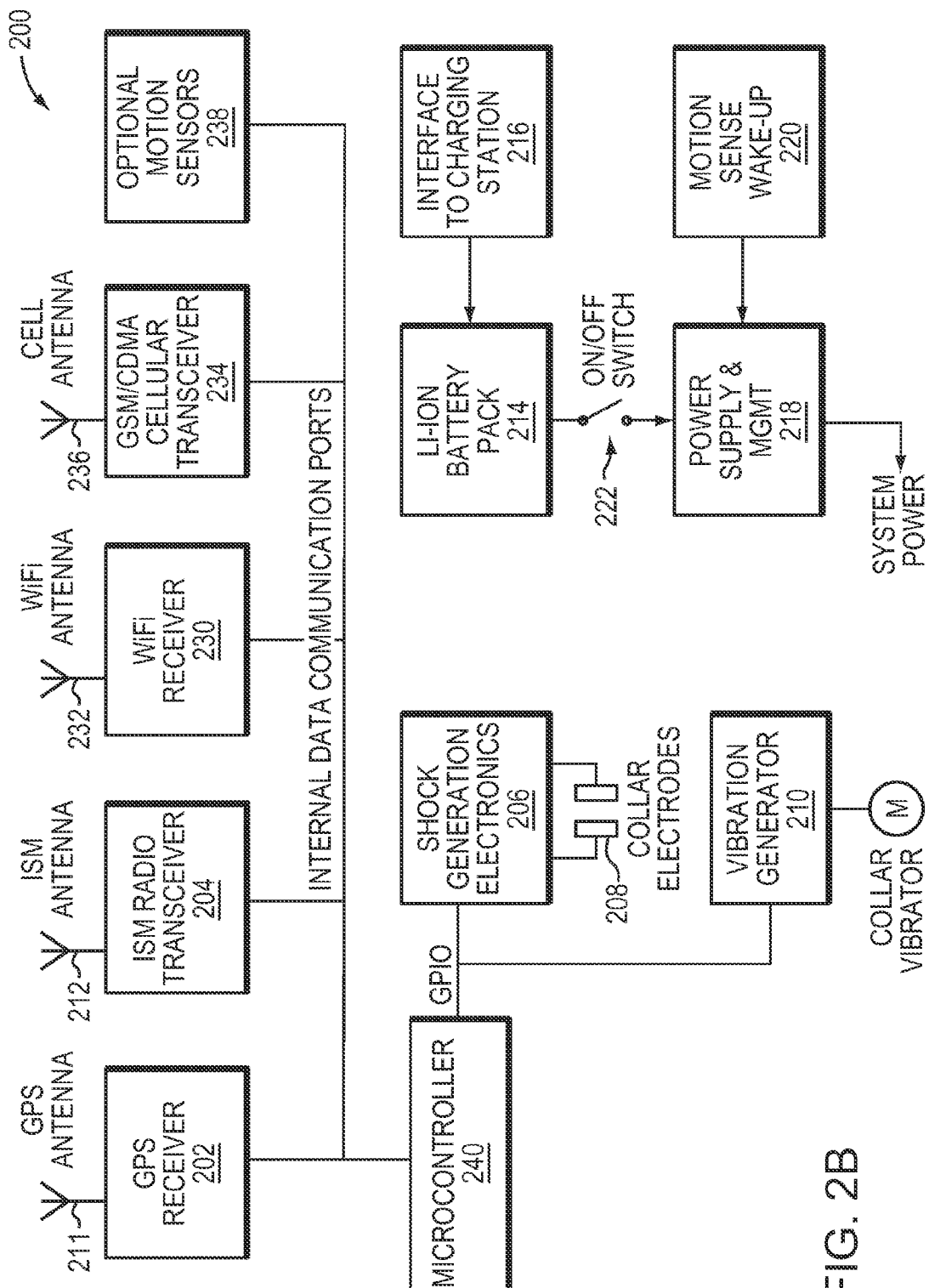

Referring to FIG. 2b, the attachment device 200 may also include components for transmitting and/or receiving data over a WIFI network (e.g., a WIFI-based positioning system) and/or a cellular network (e.g., to call the base station 106). For example, the attachment device 200 may include a WIFI receiver 230, a WIFI antenna 232, a cellular transceiver 234 (e.g., a GSM/CDMA cellular transceiver), and/or a cellular antenna 236. The attachment device 200 may also include an optional motion sensor 238, for example, to detect motion of the animal 102. In the depicted embodiment, a microcontroller 240 is included for executing instructions and controlling the components of the attachment device 200.

Figure 3:
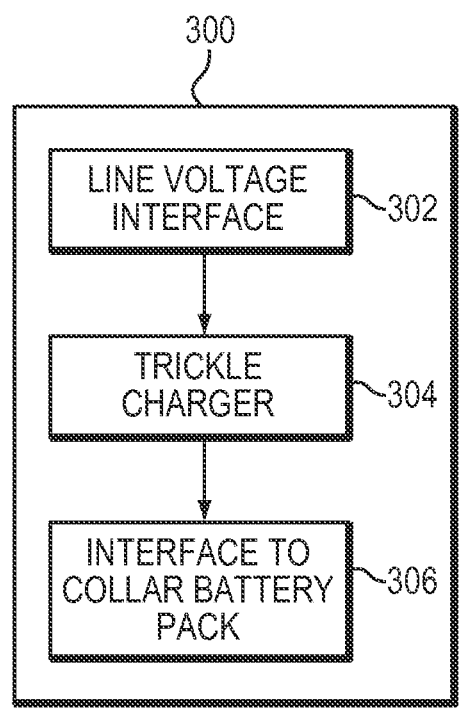
FIG. 3 is a schematic representation of a charging station for charging a battery, in accordance with certain embodiments of the invention.

Referring to FIG. 3, in one example, a charging station 300 for the attachment device 200 includes a line voltage interface 302 (e.g., a plug), a trickle charger 304, and a battery interface 306. The battery interface 306 provides a connection with the battery 214 of the attachment device 200.

Referring again to FIG. 1, in various embodiments, the system 100 may have multiple attachment devices 104 for tracking the positions of multiple animals 102. For example, a user may wish to track the positions of two or more dogs. In this instance, the user can outfit each dog with an attachment device 104, and the system 100 will monitor the position of each dog and deliver a stimulus to each dog separately, as needed. For example, if one dog is approaching a forbidden area, a stimulus may be delivered to that particular dog, while the other dog(s) do not receive a stimulus. To distinguish each individual animal 102 from others that are being monitored, each attachment device 104 may be associated with an identification number and may transmit that number to the base station 106 or other system components.

The base station 106 is generally a portable computing device such as a smart phone (e.g., an IPHONE or an ANDROID device) or a tablet computer (e.g., an IPAD) that communicates with other system components (e.g., the attachment device) and may be operated by a user of the system. The base station 106 preferably includes a graphical display and an input device (e.g., a touchscreen or keyboard) to provide data to the user and/or receive input from the user. In various embodiments, commercially available smart phone or tablet computing devices provide the desired processor power, memory, inexpensive hardware, such as a touch screen for map displays and command input, and a speaker for alarms, and wireless connectivity for linking to other system components (e.g., a personal computer).

The base station 106 preferably includes a GPS receiver, which may be incorporated within or mounted to an external case of the base station. For example, the GPS receiver may be externally mounted and connected through a USB port. The GPS receiver is generally employed when the base station is used outdoors, for example, in a walk mode or when searching for a lost pet. When communicating with the attachment device, the base station 106 may compute the relative position between the base station 106 and the attachment device 104, thereby acting as a differential GPS unit. The base station 106 includes a battery, which is preferably rechargeable.

In a typical embodiment, the base station 106 includes an alarm, such as an audio alarm, a visual alarm, and/or a tactile alarm (e.g., a vibrator alarm), to alert the user when intervention may be required. For example, the alarm may alert the user when the animal 102 has entered a forbidden zone. The alarm may also inform the user about a low battery, a loss of signal, removal of the attachment device from the animal 102 (e.g., when the animal 102 has been stolen), and/or an instance in which GPS satellites or the system 100 are malfunctioning.

In various embodiments, the alarm of the base station 106 and/or the stimulation device of the attachment device 104 may be disabled either manually or automatically. For example, the user may disable the alarm and/or stimulation device manually by delivering an input command to the base station 106. Alternatively or additionally, the system 100 may recognize instances when the alarm and/or stimulation device are not needed, and may automatically disable the alarm and stimulation device. For example, when the base station 106 and attachment device 104 are in close proximity to one another, the system 100 may recognize that the user is with the animal 102 (e.g., taking the animal 102 for a walk), and the alarm and/or stimulus may be automatically disabled.

In various embodiments, the graphical display of the base station 106 is used to display the location of the animal 102 and/or the base station 106 on a map of the surrounding territory. The mapping feature may be useful for tracking and/or locating the animal 102. For example, if the animal 102 (e.g., a dog) were being walked off leash and ran away, the user may locate the animal 102 on the map and use the map to retrieve the animal 102.

Figure 4:
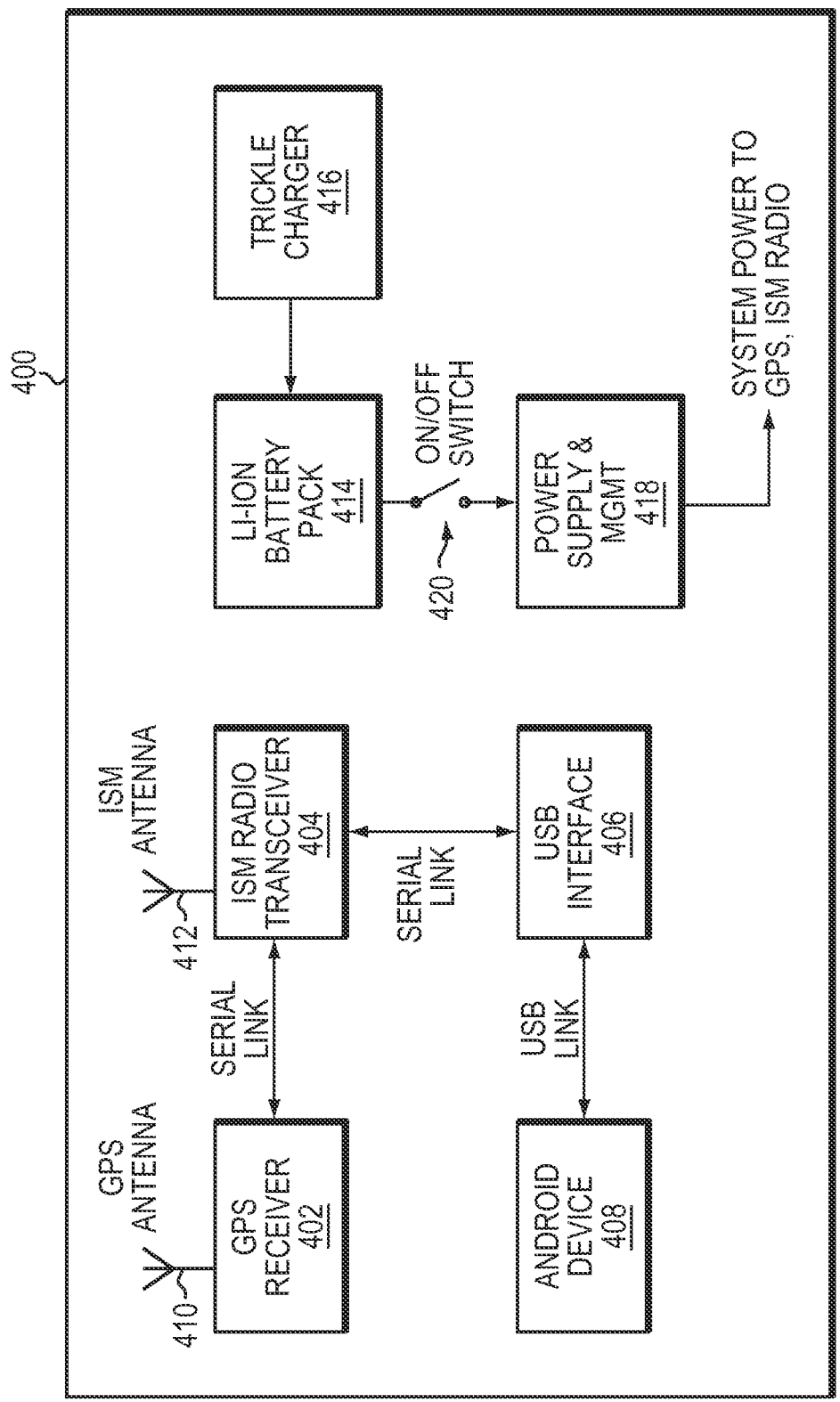
FIG. 4 is a schematic representation of a portable base station operated by a user of the system of FIG. 1, in accordance with certain embodiments of the invention.

FIG. 4 is a schematic diagram of a base station 400 in accordance with certain embodiments of the invention. The base station 400 includes a GPS receiver 402, an ISM radio transceiver 404, a USB interface 406, and a portable computing device 408 (e.g., an ANDROID device). The GPS receiver 402 and the ISM radio 404 are linked to one another (e.g., with a serial link) and include a GPS antenna 410 and an ISM antenna 412, respectively. The USB interface 406 is linked to the ISM radio transceiver 404 (e.g., with a serial link), and the computing device 408 is linked to the USB interface 406 using a USB link. The base station 400 also includes a battery 414 (e.g., a lithium ion battery pack), a charger 416 (e.g., a trickle charger), and a power supply 418 for delivering power to base station components. A switch 420 is included to turn the base station 400 on or off.

Referring again to FIG. 1, in certain embodiments, the system 100 includes an external computing device 110, such as a personal computer or workstation. The attachment device 104, base station 106, and/or other system components are in communication (e.g., wireless communication) with the external computing device 110. For example, the base station 106 may interface with the external computing device 110 through a wireless port. In one embodiment, the external computing device 110 provides tools for generating maps and defining boundaries for properties and forbidden areas. For example, the external computing device 110 may allow a user to adjust boundaries by dragging boundary points and lines. A cellular application may be included for transmitting data to or from the base station 106, which may be, for example, a smart phone. For example, when the user is not at home, the external computing device 110 may call the base station 106 in an alarm situation, and the animal's location may be displayed on a map on the graphical display of the base station 106. Communication between the attachment device 104, the base station 106, and/or the external computing device 110 permits the exchange of data. For example, the position of the animal 102 may be transmitted to the external computing device 110 where it may be stored and accessed at a later time. In one embodiment, the external computing device 110 and/or the base station 106 allow the user to select and/or record alternative warning sounds and reward sounds.

To increase the accuracy of GPS position calculations, the system 100 may also include a GPS differential localizer. The GPS differential localizer is generally placed at an outdoor location with an unobstructed view of the sky. In various embodiments, the GPS differential localizer monitors error information from each satellite based on factors such as atmospheric distortion, allowing the system 100 to accurately compute boundary points, boundary lines, and/or pet locations. The GPS receivers in the various system components (e.g., the attachment device 104 and the base station 106) receive satellite data at the same time and with the same displacement errors. These errors may be largely or entirely negated using the GPS differential localizer. For example, the GPS differential localizer may improve position measurement accuracy from about 15 meters to about 10 cm. All locations may be referenced with error corrections as computed by the differential localizer.

Figure 5:
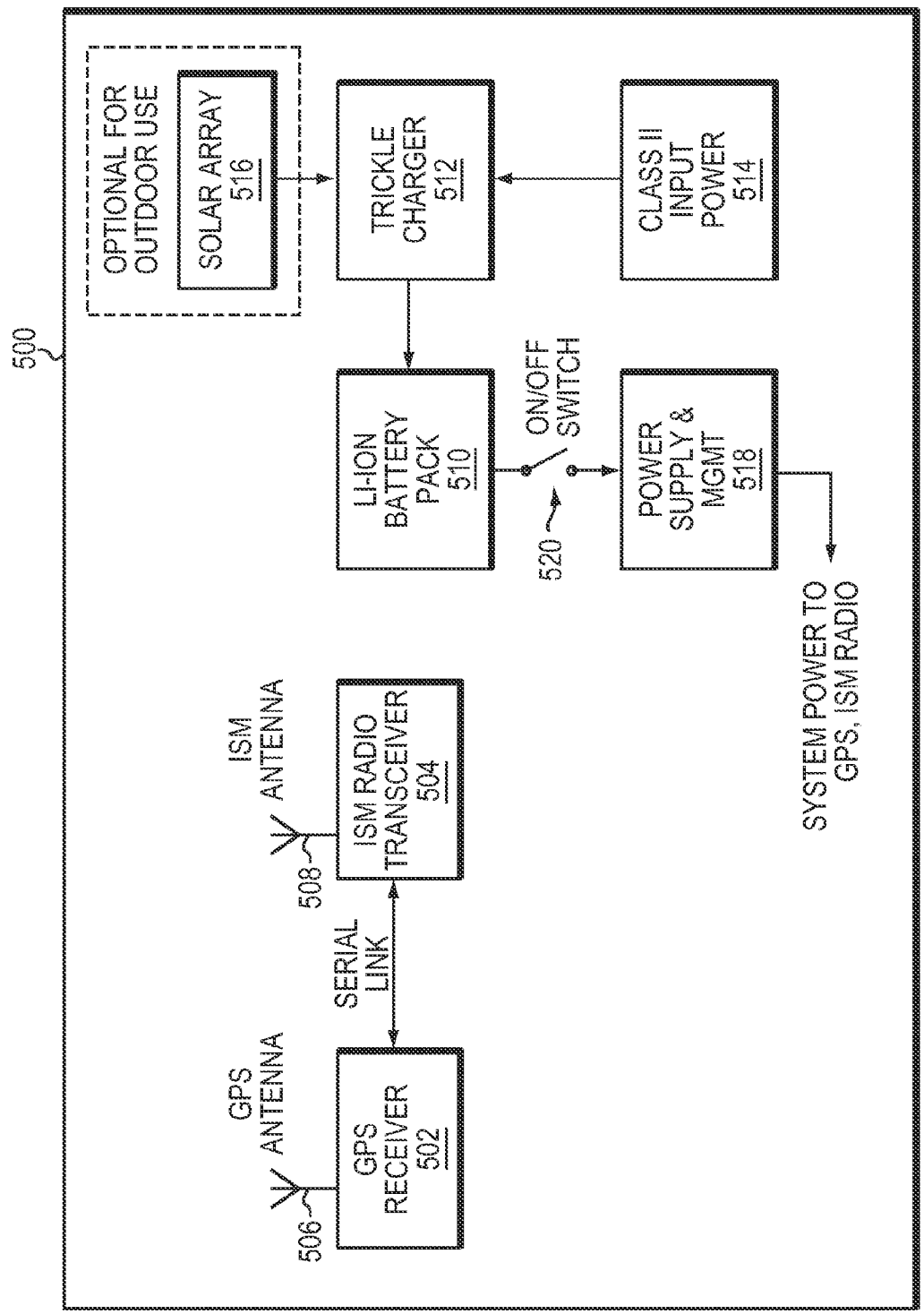
FIG. 5 is a schematic representation of a GPS differential localizer, in accordance with certain embodiments of the invention.

FIG. 5 is a schematic diagram of a GPS differential localizer 500 in accordance with certain embodiments of the invention. The GPS differential localizer 500 includes a GPS receiver 502 and an ISM radio transceiver 504 linked to one another using, for example, a serial link. The GPS receiver 502 and the ISM radio transceiver 504 include a GPS antenna 506 and an ISM antenna 508, respectively. The GPS differential localizer 500 also includes a battery 510 (e.g., a lithium ion battery pack) and a trickle charger 512 for charging the battery 510. A power source for the trickle charger 512 may include, for example, an input power source 514 (e.g., class II input power) and/or a solar array 516 (for optional outdoor use). A power supply 518 provides power to the GPS receiver 502 and the ISM radio transceiver 504. A power switch 520 may be used to turn the GPS differential localizer 500 on or off.

In some embodiments, the system 100 utilizes a mesh network to facilitate cooperative communication among the system components. The mesh network may utilize or include the radio transceiver in the attachment device 104, the base station 106, the external computing device 110, and/or a mesh network extender. In the mesh network configuration, the attachment device 104, the base station 106, and the external computing device 110 may serve as relays to propagate data through the network. The system 100 may also utilize one or more mesh network extenders to extend the range of the system on a large property and/or extend the mesh network around radio barriers such as large buildings or other structures. To conserve power, the mesh network extenders may be activated by the system only when the signal from the attachment device 104 is weak or lost. With experience, the system 100 may map locations on its grid where the network extenders are needed for transmitting coordinates, and the network extenders may be activated when the animal approaches such locations. The mesh network extenders may be solar powered.

Figure 6:
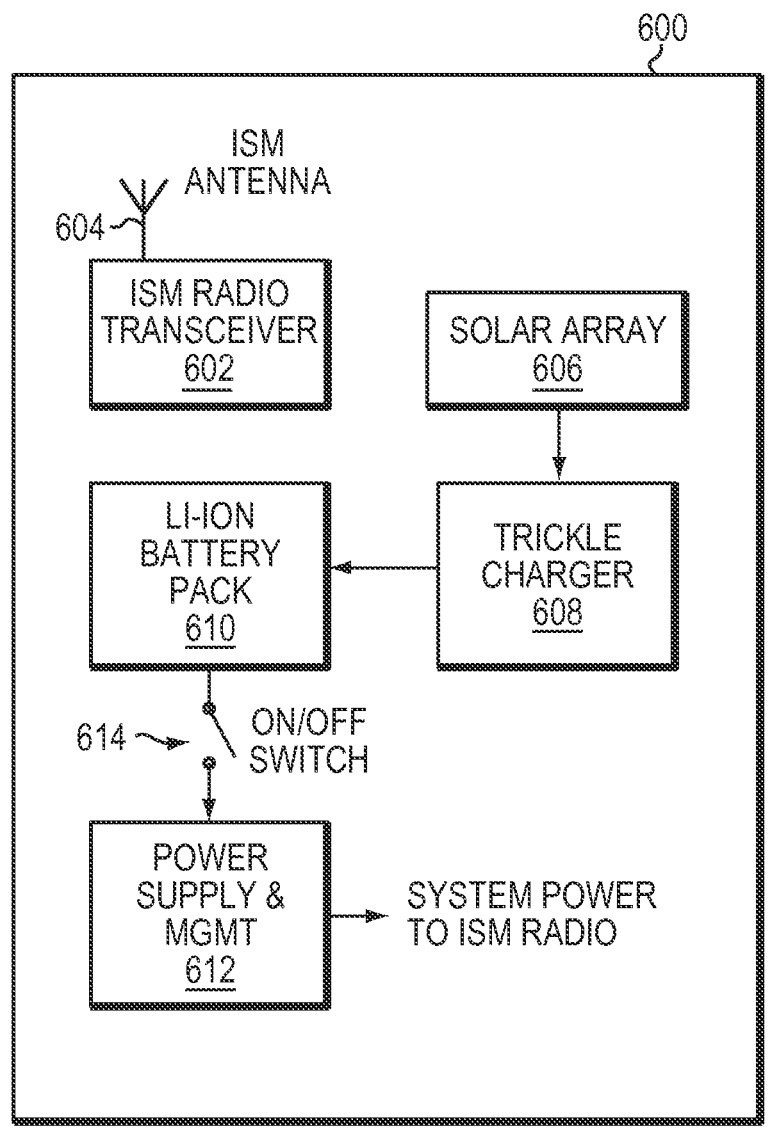
FIG. 6 is a schematic representation of a mesh network extender, in accordance with certain embodiments of the invention.

FIG. 6 is a schematic diagram of a mesh network extender 600 in accordance with certain embodiments of the invention. The mesh network extender 600 includes an ISM radio transceiver 602 having an ISM antenna 604. A solar array 606 provides energy to a charger 608 (e.g., a trickle charger), which charges a battery 610 (e.g., a lithium ion battery pack). A power supply 612 delivers power to the ISM radio transceiver 602. A switch 614 is provided to turn the extender 600 on or off.

While typical digital networks broadcast in the 2 gigahertz range, experiments have shown these frequencies to be limited in range, in the ability to pass through objects, and in loss of signal close to the ground. These limitations may present communication difficulties when an animal is roaming a large area, especially if the animal is close to the ground. To overcome these limitations, the frequency for the system may be less than 2 gigahertz. For example, the frequency may be from about 600 megahertz to about 1,200 megahertz, or preferably from about 900 megahertz to about 950 megahertz. These lower frequencies are capable of passing through most objects (including dumpsters) and are generally not affected by proximity to the ground.

In various embodiments, the system 100 is used to identify one or more areas the animal 102 is permitted to occupy and one or more areas the animal 102 is forbidden to occupy. For example, an area outside of a permitted area (e.g., a pet owner's property) may be referred to as an External Forbidden Area (EFA). Likewise, an isolated flower bed or swimming pool located within the permitted area may be referred to as an Internal Forbidden Area (IFA). As described herein, the system may be used to deliver a stimulus to an animal to encourage the animal to avoid EFAs and/or IFAs.

In some embodiments, the system delivers sounds or vibrations to the animal 102 prior to the delivery of electric shocks. For example, as the animal 102 approaches an IFA or EFA, the system 100 may provide vibrations that increase in frequency and/or intensity. The system 100 may stop delivering the vibrations when the animal 102 changes its course and moves away from the IFA or EFA. The vibrations are generally a humane stimulus, and may be felt even by deaf animals. Animals learn quickly how to respond to the vibrations to avoid receiving shocks.

When the animal 102 approaches a forbidden boundary, the system 100 may deliver warning vibrations that increase in frequency and/or intensity. Close to the boundary, the animal 102 may receive small shocks at a low rate accompanied by strong vibrations. At the boundary and inside of the forbidden area, the animal 102 may receive the maximum vibration accompanied by strong shocks at the maximum rate. When the animal 102 returns to the permitted area, the shocks and vibrations may cease immediately.

In certain embodiments, the system 100 delivers sharp, discontinuous shocks that are both more humane and more noticeable. The shocks may vary in intensity and/or frequency as the animal 102 approaches or violates forbidden areas. The system 100 may also modify the intensity and/or frequency of the shocks as the animal 102 demonstrates familiarity with its permitted terrain. For example, once the animal 102 has learned the EFA and IFA boundaries, the system may deliver shocks only for actual violations. Compared to previous systems that utilize continuous shocks, the use of discontinuous shocks is advantageous because animals are generally less likely to become accustomed or inured to the discontinuous shocks.

In some embodiments, the stimulus delivered to the animal 102 depends on whether the forbidden area is an EFA or an IFA. For example, vibrations and/or shocks may continue indefinitely during IFA incursions. Continuing the vibrations or shock in an EFA, however, may serve no purpose beyond a defined distance from the boundary. For example, the vibrations and/or shocks may become more intermittent or off after the animal has met or exceeded a defined distance from a permitted area within an EFA.

In one implementation, the system 100 notifies the user when the animal 102 has entered a forbidden area. For example, the alarm of the portable base station 106 may emit an audible noise and/or a vibration when the animal 102 enters an IFA or EFA. Additionally or alternatively, the system 100 may call the base station 106 (e.g., from the external computing device 110) and a visual alert may be provided for the user. For example, the base station 106 may be a smart phone with a smart phone app, the external computing device 110 may call the smart phone, and the smart phone may utilize the app to display the animal's location on a map.

In certain embodiments, a user defines EFAs and/or IFAs utilizing a system setup mode. In general, there may be one permanent EFA (e.g., a region outside of the user's property) and as many IFAs as desired. Additional EFAs and IFAs may be defined for other properties of interest, such as a property corresponding to a second home or a friend or family member's home.

Several different techniques may be used to define EFA and IFA boundaries. With one method, the user holds a GPS receiver (e.g., in the attachment device 104 or portable base station 106), walks along a desired boundary (e.g., from one edge of the boundary to another edge of the boundary), the system 100 tracks the path of the user, and the EFA or IFA boundary is then defined to correspond to the path. The boundary may be curved, for example, to conform to a curved flower bed or a property edge along a curved road.

With another method, the user holds a GPS receiver (e.g., in the attachment device 104 or portable base station 106) and walks from one edge of a boundary to the other edge. The system identifies the endpoints of the boundary, and a straight line is drawn between these two points to define the boundary. When the user is positioned at an endpoint of the boundary, the user may provide input to the system 100 so that the system 100 recognizes the desired location for the endpoint.

Another method of defining an EFA or IFA involves the use of a map, such as a satellite map (e.g., available at www-.google.com), in which the property of interest is defined or recognizable. In one implementation, the user holds a GPS receiver (e.g., in the attachment device 104 and/or base station 106), walks to a location (e.g., a corner) on the property, and provides input to indentify the location to the system. Starting from that known location, the system 100 utilizes the map to define the perimeter of the property. For example, the system 100 may recognize the property boundaries and define an EFA as an area outside of the property boundaries.

In alternative embodiments, the user may simply identify the property on a map. For example, a map may be provided on a graphical display of the base station and/or external computing device, and the user may identify the property using an input device, such as a mouse, a touch pad, or a finger (e.g., on a touch screen). With the property identified, the boundaries of property may be automatically recognized (e.g., to define an EFA).

In another example, the user is able to draw an EFA and/or IFA on the graphical display of the base station and/or external computing device. For example, a map may be provided on the graphical display, and the user may be able to draw EFA or IFA boundaries directly onto the map, using the input device.

In various embodiments, the system 100 provides tools that allow the user to adjust the boundaries using the graphical display. For example, the system 100 may include a graphical interface that allows the user to select a boundary and adjust the position and/or shape of the boundary (e.g., using a mouse or finger). All boundary points and lines may be adjustable by computer input. For example, when a property has a shoreline or open woods at one side, the user may drag or translate the boundary to give the animal 102 additional distance into the water or the woods.

An additional settable boundary corresponds to the edges of a building (e.g., the user's house) within which there is generally no GPS signal. Within the house, locations may be computed using WIFI-based localizing.

The system 100 also provides different setup options for different types of animals, such as dogs and cats, which may be treated differently by the system 100. For example, dogs are generally not free to roam off a user's property or to enter sensitive planting areas. Cats, however, are generally free to prowl around a neighborhood. A safe prowling area for a cat may be defined on a map (e.g., displayed on the base station or external computing device) to prevent the cat from wandering too far or from crossing streets, which are the primary hazards for cats.

The system may also be used to locate and recover the animal 102 when it has wandered too far from the property and/or become "lost." For example, the location of the animal 102 and/or the base station 106 may be displayed on a map on the base station 106 (e.g., an IPOD or a smart phone) and/or external computing device 110. In one implementation, a direction and/or distance from the base station 106 to the animal 102 is provided to the user.

In some embodiments, the system 100 monitors the location of the animal 102 with respect to the location of the user and automatically enables or disables certain features. For example, when the base station 106 and attachment device 104 are in close proximity to one another, the system 100 may recognize that the user is with the animal 102 (e.g., taking the animal for a walk), and the system 100 may automatically disable borders that would otherwise trigger a stimulus. The disablement of borders may be selective. For example, the system 100 may automatically disable EFA borders while leaving IFA borders active. Likewise, the system 100 may disable only lower risk borders, such as a border adjacent to an open field, while leaving higher risk borders (e.g., a border next to a busy street) active.

Advantageously, by tracking the position of the animal 102 with respect to the location of the user, the system 100 may be used to train an animal 102 how to position itself and/or move with respect to the user. In one embodiment, the system 100 is used to teach a dog how to heel during a walk with the user. For example, the user may place the portable base station in her pocket during a walk, and the system 100 may monitor the position and heading of the user and the dog during the walk. If the dog deviates from a proper heeling position, the system may provide a stimulus (e.g., a vibration or shock) to encourage the dog to return to the proper position with respect to the user. For example, with the system set in a "heel" mode, a deviation of more than a few inches may trigger a vibration stimulus, while a deviation of a greater distance may trigger a shock stimulus. Dogs will quickly learn to heel using this approach. In one embodiment, the owner is reminded or encouraged to give the dog a treat when the dog has demonstrated proper heeling or other desirable behavior.

In another example, the system 100 includes a "walk" mode in which the system 100 acts as a virtual leash to keep the animal 102 (e.g., a dog) within a desired distance from the user. If the animal 102 attempts to exceed this distance, a stimulus (e.g., a vibration or shock) may be delivered to encourage the animal 102 to move closer to the user. The desired distance may be uniform around the user (i.e., to form a circle) or it may be nonuniform. For example, the desired distance may be shorter on one side of the user (e.g., the front) than it is on another side of the user (e.g., the right). A user generally does not want an animal to walk in front of the user, but in some locations, such as a park or a beach, the desired distance may be equidistant all around. In one embodiment, when "beach" is set upon entry, an absolute boundary is established from the direction of entry, limiting the circle to preclude the animal from leaving the beach area. On a walk, the base station may no longer benefit from the accuracy of the differential antenna. To compensate, accuracy may be enhanced by combining GPS localizing with information of the respective WIFI positioning between the attachment device 104 (e.g., a collar) and the base station 106.

When the user is walking along a street with the animal 102, the system 100 may recognize the street (e.g., using a map on the base station) and prevent the animal from entering the street through the use of warning vibrations and/or shocks. In one embodiment, the user's path defines a boundary, and the animal 102 is not permitted to cross the boundary to enter the street. The system 100 may deliver vibrations within several feet of the edge of the street, except for in front of the user where vibrations may be delivered for any position forward of the user. When the animal 102 continues to proceed in the wrong direction, shocks may be delivered.

The portable base station 106 may also include a pull-back feature that allows the user to manually trigger a stimulus to encourage the animal 102 to move to a position closer to the user. The pull-back feature may be used, for example, when the animal 102 encounters another person (e.g., a small child) or another animal. In such instances, the user may trigger the pull-back stimulus, and the animal 102 will move closer to the user.

To facilitate communication among the system components, the system 100 may utilize protocols in which each component (e.g., the base station 106 and the attachment device 104) has a unique identifier. A system setup menu allows the user to pair one or more attachment devices 104 with the controlling base station 106. Normal communications generally involve the attachment device 104 waking itself up and transmitting its coordinates to the base station 106. The base station 106 then issues return commands, for example, to alert or shock the animal 102, plus the desired latency for the next transmission. The base station alarm may activate if the attachment device 104 does not transmit a signal when expected.

In certain embodiments, the system 100 may cooperate with other similar systems owned or operated by other users. For instance, neighbors with adjoining properties could utilize separate systems that are configured to allow dogs to range with each other over adjoining properties. In that case, two or more systems may be integrated to allow common boundaries. For example, each system 100 may have its individual controls and alarms (e.g., with separate base stations 106), but the dogs could enjoy the entire range of a communal property or properties owned by multiple users. This feature may encourage friendly neighbors to buy their own systems and configure the systems to cooperate with one another.

The systems and methods described herein have several other applications outside of monitoring and controlling the locations of pets. For example, the systems and methods may be used to monitor people, such as small children, senescent adults, and prisoners. In such embodiments, the attachment device 104 may consist of or include a lockable band that is, for example, worn around a person's wrist or ankle. When the system 100 is used to monitor a child, the base station alarm may immediately alert the child's parents when the child moves to an undesirable location (e.g., outside of the child's yard). The attachment device 104 may deliver vibrations and/or audible messages to the child to encourage the child to return to a safer location. For example, the attachment device 104 may deliver an audible message in a parent's voice telling the child to return home.

As described above, the system may also be used to monitor a child's position with respect to a parent's position. In such instances, two-way communication between the base station 106 and the attachment device 104 may be utilized. For example, the base station 106 may be set for a distance limit, and the base station 106 may alert the parent when the child wanders beyond that distance. In one embodiment, the base station 106 displays the child's location on a map.

Similar systems and methods may be used to monitor wandering senescent adults or prisoners. In one example, the systems and methods are used to identify potentially dangerous or abusive situations and to deliver alarms to alert a guard or caregiver. In addition to monitoring and controlling location with respect to configured zones, the system may also be used to monitor and/or control location with respect to other individuals equipped with tracking devices. In such an instance, the system may ensure that appropriate buffer zones or distances are maintained between tracked individuals.

To facilitate use of the system 100 within a building or other structure, where GPS signals may not be available, the system 100 may utilize position emitters that mimic the role of satellites within the GPS system. The use of position emitters within a building is referred to herein as building position sensing (BPS). With the BPS approach, three or more position emitters may be positioned within the building, and the location(s) of the attachment device 104 and/or base station 106 are tracked using the emitters, rather than or in addition to GPS satellites. The BPS approach may be used to establish and/or enforce IFAs within a user's home. Chips are currently available which allow positioning within a building based upon WIFI localization.

The BPS approach may also be used to set up monitoring systems within a building. Currently, nursing homes use door alarms to detect when patients are leaving secure areas, but it is difficult to track the position of a patient. With BPS technology, the positions of multiple patients may be tracked and displayed on monitors, and staff members may be notified (e.g., with an alarm) when IFAs or EFAs are violated. In a nursing home, an electric appliance or a stairway may constitute an IFA for some patients.

The systems and methods may also be used to track inanimate or non-living assets, such as cargo containers in a port. Large ships offload thousands of containers that must be stacked in precise locations for quick pickup to, for example, clear the port for the next ship. Current tracking mechanisms are error prone and lead to expensive restacking and delays. In certain embodiments, an attachment device 104 with a GPS tracker attached to each container is used to monitor the position of the container, guide the stacker to the correct stack, and/or alert the stacker if he or she is heading in the wrong direction. The approach allows misplaced container to be easily located, which may be difficult to do using previous systems.

The systems and methods described herein generally perform real time computations to monitor the location of the animal 102 and deliver a stimulus to encourage the animal 102 to remain in permitted areas. As mentioned, when the animal 102 approaches a forbidden area, the animal 102 may be warned with a stimulus (e.g., vibrations), which may increase with proximity to the area. If the animal 102 proceeds to enter the forbidden area, the warning stimulus may be replaced with punishing shocks, which may increase in intensity, until the animal 102 returns to a permitted area.

Computing the distance between the animal 102 and a boundary, or the time it will take the animal 102 to reach the boundary (which depends on the animal's velocity), can be a computationally intensive procedure. A computer system (e.g., the base station or external computing device) performing these calculations must repeatedly calculate the animal's position, identify the closest boundary location(s), and determine the distance between the animal 102 and the boundary. If attempted in real time, the computer system may be too slow to issue a timely stimulus when the animal 102 approaches or crosses a boundary.

Figure 7:
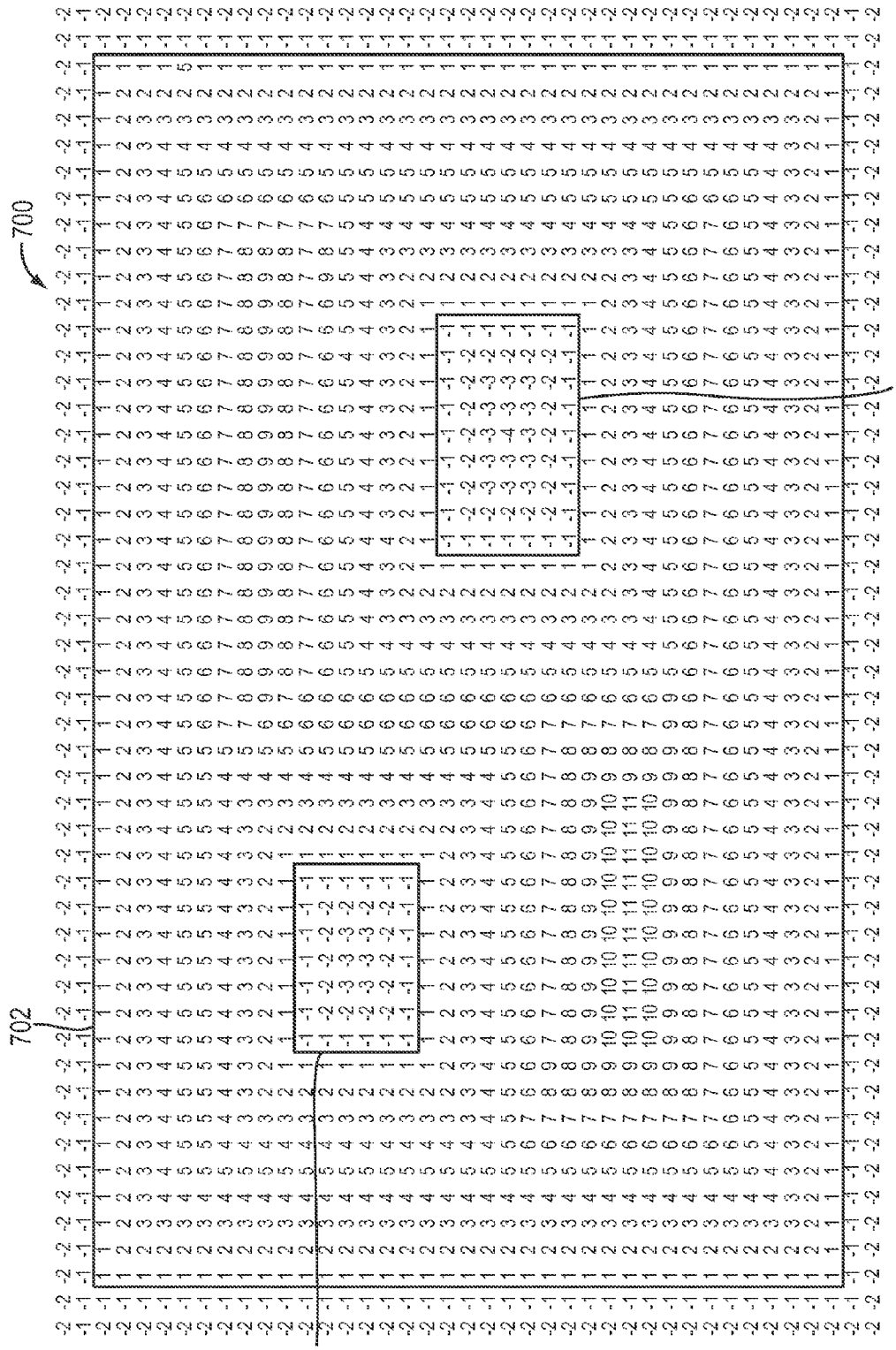
FIG. 7 is a schematic top view of a property superimposed onto a grid of numerical values corresponding to distances within the property, in accordance with certain embodiments of the invention.

Referring to FIG. 7, in certain embodiments, a method is provided for computing, in real-time, the distance between the animal 102 and one or more boundaries on or within a property 700. For example, using a map of the property 700 displayed on a graphical display of the base station 106 or external computing device 110, the user may define an external perimeter or EFA boundary 702 that must not be crossed. The user may optionally define IFAs, such as a flower bed 704 or a swimming pool 706. As depicted, the property 700 and boundaries are preferably configured or arranged on a rectangular grid or matrix, although non-rectangular grids (e.g., a polar grid) may also be used. Next, for each element of the grid (e.g., each cell between gridlines or each intersection of gridlines), the system calculates the distance to the closest boundary. Each time an EFA or IFA boundary is added or modified, the system may recalculate the distance to the closest boundary, for each location on the grid.

In the depicted example, positive numbers within the grid correspond to permitted areas, and negative numbers correspond to forbidden areas. Areas outside of permitted areas may be represented by negative numbers that increase in magnitude with the distance from the boundary. The larger the magnitude of a negative number, the more serious the infraction.

Each number within the grid generally represents the closest distance to the boundaries. The closest distance may be computed along a direction that is not parallel to a gridline (e.g., in a diagonal direction). Alternatively and as depicted, the closest distance may be computed along a gridline direction, ignoring diagonal distances, for simplicity.

By pre-calculating and storing the numerical values within the grid as shown, the system is able to minimize the computation requirements associated with determining the position of the animal 102 with respect to the boundaries. As the animal 102 moves throughout the property, the system can determine how far the animal 102 is from the closest boundary by looking up the value in the grid that corresponds to the location of the animal 102 on the property.

The animal's velocity may also be calculated using the grid values, for example, by calculating a rate of change in the grid values. The velocity may be used to deliver a stimulus at variable distances, depending on an estimated time to intercept with a boundary. For example, the system 100 may estimate that the animal 102 will reach a boundary in two seconds, and a warning stimulus may be delivered one second before the boundary is reached.

The example grid includes negative numbers that increase in magnitude with distance from the boundaries of forbidden areas. Just as changes in positive numbers may show how quickly the animal is approaching a boundary for the purpose of delivering warning vibrations, the rate of change in the negative numbers in a forbidden area may show whether an incursion is increasing or decreasing, for the purpose of delivering corrective shocks. For example, if the animal is within a forbidden area and moving away from a permitted area, the intensity of the corrective shocks may be increased. By contrast, if the animal is moving towards a permitted area, the corrective shocks may be reduced or eliminated.

The property depicted in FIG. 7 is an example of a simple rectangular property with two internal forbidden zones to illustrate the use of numerical values within the grid. In reality, the property and the grid may follow any conceivable shape and have any number of zones. For example, the property and/or grid may be substantially rectangular, square, circular, triangular, oval, wedge-shaped, or combinations thereof.

The memory required to store the computed distances in the grid is generally minimal and easily satisfied by today's computing devices, such as smart phones, tablet computers, personal computers, and workstations. For example, a precision for measuring the location of an animal on a property may be from about 1 inch to about 10 inches, or preferably about 3 inches. With a 3-inch precision, the grid may include 16 entries per square foot. Accordingly, a one-acre property (i.e., 43,560 square feet) may be completely mapped by approximately 697,000 entries (i.e., 43,560 square feet times 16 entries per square foot), which is a relatively small storage requirement for today's computing devices.

In one embodiment, a similar (moving with the owner) grid is employed to control an animal's (e.g., a pet's) behavior when following a user on a walk or when heeling, or when running free in a park. In this case, the position of the grid may follow the position of the user, such that numerical values within the grid represent distances from the owner.

The system 100 generally includes at least one processor for performing calculations and executing a set of instructions (e.g., software). The processor may be included in or be in communication with the attachment device 104, the portable base station 106, and or the external computing device 110. For example, the processor may be included in a personal computer, a workstation, a tablet computer, a cellular phone, or a smart phone. By executing the instructions, the processor may be used to map one or more permitted areas and/or forbidden areas, track the position of the animal 102 with respect to these areas, direct the implementation of a stimulus to the animal 102, and/or facilitate communicate between and among the system components. The instructions may be incorporated into the system using a software application (e.g., a smart phone "app").

In general, system components may utilize software to execute one or more functions and perform the methods described herein. The software may be implemented in various forms, for example, it may be in the form of a Java applet or program that is downloaded to the system 100 and runs in conjunction with a web browser. The software also may be in the form of a standalone application, implemented in a multi-platform language such as .Net or Java, or in native processor executable code.

In one embodiment, the software is specifically implemented for the purpose of implementing functions described herein. In another embodiment, the software includes other functionality, as well as implementing functions described here. For example, the software may be included as part of an operating system, application server, mobile application (or "app"), application program, and/or other software. The software may perform tests when other functions of such operating systems, application servers, and/or application programs are not using the full capacity of one or more system components.

In certain embodiments, the system components (e.g., the attachment device 104, the base station 106, and/or the external computing device 110) communicate with one another using a network. The communication may take place via any media such as ISM radio, standard telephone lines, cell phone networks, LAN or WAN links (e.g., T1, T3, 56 kb, X.25), broadband connections (ISDN, Frame Relay, ATM), wireless links (802.11, Bluetooth, cellular, etc.), and so on, in any suitable combination. The type of network is not a limitation, and any suitable network may be used. Non-limiting examples of networks that can serve as or be part of the network include a wireless or wired Ethernet-based intranet, a local or wide-area network (LAN or WAN), and/or the global communications network known as the Internet, which may accommodate many different communications media and protocols.

The market for pet tracking and training devices is enormous and one of the few areas that has not been affected by the recent economic downturn. Compared to previous systems, the systems and devices described herein are generally less expensive and easier to install. For example, the cost of installing a previous, perimeter control system that utilizes a buried perimeter wire is generally between $1,500 and $2,000. By contrast, embodiments of the system and devices described herein cost about $1,200 and may be installed by the buyer, with technical support provided, as needed. The packaged system may include one collar with a recharger, one base station (e.g., ANDROID) with a recharger, and one differential GPS. In one embodiment, the system hardware costs approximately $300.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of controlling a position of an animal, the method comprising the steps of:
    tracking a position of the animal using a global positioning system and a first global positioning system receiver attached to the animal;
    tracking a time-varying position of a user using the global positioning system, the user having a base object comprising a second global positioning system receiver;
    determining a relative position of the animal with respect to the user accurately, based on positions of the animal and the user, the base object acting as a differential global positioning unit;
    computing a velocity of the animal and, based on the velocity, determining a time when the animal will reach a boundary relative to the user; and
    when the relative position exceeds a minimum value, providing a stimulus to the animal to encourage the animal to reduce the relative position.

2. The method of claim 1, wherein the stimulus is selected from the group consisting of a vibration, an electrical shock, and a noise.

3. The method of claim 1, wherein the minimum value is nonuniform around the user.

4. The method of claim 1, wherein (i) the base object comprises a heel mode and a walk mode, and (ii) the stimulus is provided when the relative position exceeds a minimum value associated with at least one of the heel mode and the walk mode.

5. The method of claim 1, wherein at least one of a strength and a frequency of the stimulus is based on a magnitude of the relative position.

6. The method of claim 1, further comprising the step of providing an alarm configured to alert a user of an event selected from the group consisting of the animal entering a forbidden zone, a low battery, a loss of signal, removal of an attachment device from the animal, theft of the animal, and a malfunctioning positioning system.

7. The method of claim 1, wherein the determining step comprises receiving satellite data at a substantially same time and with a substantially same displacement error at both of the first and second global positioning system receivers.

8. A method of restraining a position of an animal, the method comprising the steps of:
    receiving, at a base station, information defining at least one boundary of a territory;
    monitoring a position of an animal within the territory using a differential global positioning system comprising a first global positioning system receiver attached to the animal and a second global positioning system receiver disposed at a fixed location on the territory;
    determining a distance accurately between the position of the animal and the at least one boundary by receiving satellite data at a substantially same time and with a substantially same displacement error at both of the first and second global positioning system receivers;
    computing a velocity of the animal and, based on the velocity, determining a time when the animal will reach the at least one boundary; and
    providing a stimulus to the animal to encourage the animal to stay within the territory.

9. The method of claim 8, wherein a strength of the stimulus is based on the position of the animal in the territory.

10. The method of claim 8, wherein a frequency of the stimulus is based on the position of the animal in the territory.

11. The method of claim 8, wherein the stimulus is selected from the group consisting of a vibration, an electrical shock, and a noise.

12. The method of claim 8, further comprising the steps of:
providing a grid comprising elements corresponding to portions of the territory;
computing numerical values for the elements in the grid, each numerical value corresponding to a distance between the element and the at least one boundary; and
identifying an element in the grid corresponding to the position of the animal,
wherein the distance between the animal and the at least one boundary is determined based on the numerical value associated with the element.

13. The method of claim 12, further comprising the steps of:
identifying at least two elements in the grid, the at least two elements corresponding to the animal's position in the territory over time;
computing a velocity of the animal with respect to the at least one boundary, based on numerical values associated with the at least two elements;
providing a stimulus to the animal based on the velocity, to encourage the animal to stay within the territory.

14. The method of claim 8, further comprising the step of providing an alarm configured to alert the user of an event selected from the group consisting of the animal entering a forbidden zone, a low battery, a loss of signal, removal of an attachment device from the animal, theft of the animal, and a malfunctioning positioning system.

15. The method of claim 8, wherein the information defining the at least one boundary of the territory is obtained by tracking a path of the user having a base object comprising a third global positioning system receiver.

16. A method of restraining a position of an animal, the method comprising the steps of:
receiving, at a base station, information defining at least one boundary of a territory;
monitoring a position of an animal within the territory using a differential global positioning system comprising a first global positioning system receiver attached to the animal and a second global positioning system receiver disposed at a fixed location on the territory;
determining a distance accurately between the position of the animal and the at least one boundary;
providing a stimulus to the animal to encourage the animal to stay within the territory;
discontinuing the monitoring of the position of the animal within the territory using the differential global positioning system and enabling monitoring of the position of the animal relative to a user having a base object and a time-varying position, the base object comprising a third global positioning system receiver and acting as a differential global positioning system unit; and
subsequent to the enabling of relative position monitoring, when the relative position exceeds a minimum value, providing a stimulus to the animal to encourage the animal to reduce the relative position.

17. The method of claim 16, wherein the stimulus is at least one of a vibration, an electrical shock, and a noise.

18. The method of claim 16, wherein monitoring the position of the animal within the territory is automatically discontinued when a relative distance between the animal and the user is below a threshold distance.

19. The method of claim 16, wherein the base object comprises a heel mode and a walk mode.

20. The method of claim 16, further comprising the step of providing an alarm configured to alert the user of an event selected from the group consisting of the animal entering a forbidden zone, a low battery, a loss of signal, removal of an attachment device from the animal, theft of the animal, and a malfunctioning positioning system.

21. The method of claim 16, wherein the determining step comprises receiving satellite data at a substantially same time and with a substantially same displacement error at both of the first and second global positioning system receivers.

22. The method of claim 16, wherein monitoring of the position of the animal relative to the user comprises receiving satellite data at a substantially same time and with a substantially same displacement error at both of the first and third global positioning system receivers.

23. The method of claim 16, further comprising the steps of computing a velocity of the animal and, based on the velocity, determining a time when the animal will reach the at least one boundary.

24. The method of claim 16, further comprising the steps of computing a velocity of the animal and, based on the velocity, determining a time when the animal will reach a boundary around the user.

* * * * *